(12) United States Patent
Siddique et al.

(10) Patent No.: US 12,477,302 B2
(45) Date of Patent: Nov. 18, 2025

(54) CALCULATING A LOCATION OF USER EQUIPMENT PRIOR TO COMMUNICATING AN SMS MESSAGE TO AN EMERGENCY NUMBER

(71) Applicant: T-MOBILE INNOVATIONS LLC, Overland Park, KS (US)

(72) Inventors: Zaheer Mohammed Siddique, Overland Park, KS (US); Hyung Keun Choi, Overland Park, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 402 days.

(21) Appl. No.: 18/106,783

(22) Filed: Feb. 7, 2023

(65) Prior Publication Data
US 2024/0267706 A1 Aug. 8, 2024

(51) Int. Cl.
| H04W 4/00 | (2018.01) |
| H04W 4/029 | (2018.01) |
| H04W 4/14 | (2009.01) |
| H04W 4/90 | (2018.01) |

(52) U.S. Cl.
CPC ............. *H04W 4/029* (2018.02); *H04W 4/14* (2013.01); *H04W 4/90* (2018.02)

(58) Field of Classification Search
CPC .......... H04W 4/029; H04W 4/90; H04W 4/14
See application file for complete search history.

(56) References Cited

U.S. PATENT DOCUMENTS

| 10,667,199 | B1* | 5/2020 | Mitchell, Jr. ....... H04M 7/0093 |
| 2007/0060097 | A1* | 3/2007 | Edge .................... H04M 11/04 455/404.1 |
| 2010/0297980 | A1* | 11/2010 | Alberth ................ H04W 76/50 455/404.2 |
| 2013/0109344 | A1* | 5/2013 | Ung ...................... H04W 4/90 455/404.2 |
| 2017/0150335 | A1* | 5/2017 | Self ....................... H04W 4/90 |
| 2017/0372592 | A1* | 12/2017 | Neravati ............ G08B 21/0446 |

* cited by examiner

*Primary Examiner* — Erika A Washington
(74) *Attorney, Agent, or Firm* — Shook, Hardy & Bacon L.L.P.

(57) ABSTRACT

Systems, methods, and computer-readable media are provided for calculating a location of user equipment (UE) prior to communicating an SMS message to an emergency number. More particularly, additional time is provided to location services so a complete location can be determined, prior to an SMS message being composed and communicated to emergency services. To do so, the UE transitions into an emergency mode as soon as the recipient of the text message is identified as an emergency number (e.g., 911). This immediately causes the UE to unblock all numbers (i.e., in case emergency services needs to initiate a voice call to the UE), enable location services, and initiate a location calculation. As a result, the location calculation is already determined by the time the user composes the text hits send.

20 Claims, 4 Drawing Sheets

CALCULATING A LOCATION OF USER EQUIPMENT PRIOR TO COMMUNICATING AN SMS MESSAGE TO AN EMERGENCY NUMBER

SUMMARY

A high-level overview of various aspects of the invention is provided here as an overview of the disclosure and to introduce a selection of concepts further described below in the detailed description. This summary is not intended to identify key features or essential features of the claimed subject matter, nor is it intended to be used as an aid in isolation to determine the scope of the claimed subject matter.

In brief and at a high level, this disclosure describes, among other things, systems, methods, and computer-readable media that enables the network to provide additional time to location services so a complete location can be determined, prior to an SMS message being composed and sent. To do so, the UE transitions into an emergency mode as soon as the recipient of the text message is identified as an emergency number (e.g., 911). This immediately causes the UE to unblock all numbers (i.e., in case emergency services needs to initiate a voice call to the UE), enable location services, and initiate a location calculation. As a result, the location calculation is already determined by the time the user composes the text hits send.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

Figure 1:
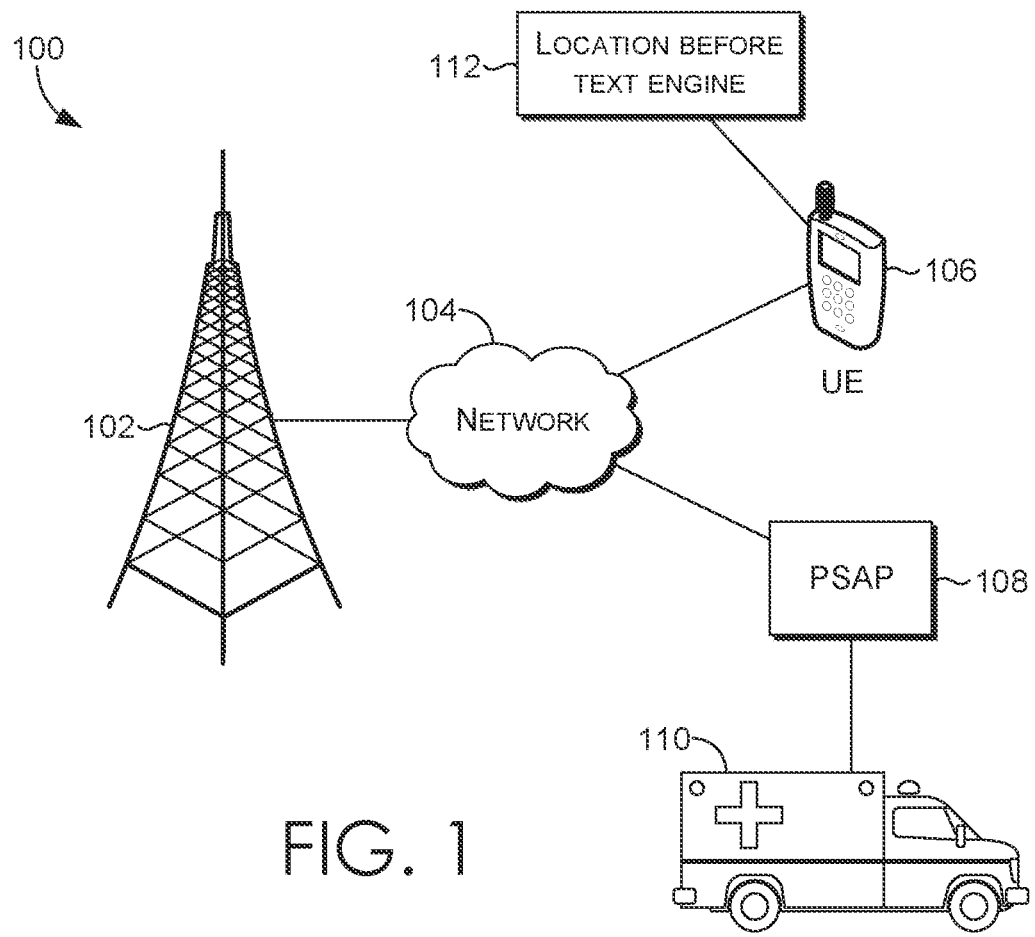
FIG. 1 depicts a schematic for an exemplary device, in accordance with an embodiment of the present invention.

The subject matter of select embodiments of the present invention is described with specificity herein to meet statutory requirements. The Detailed Description is not intended to define what is regarded as the invention, which is the purpose of the claims. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| AWS | Advanced Wireless Services |
| BRS | Broadband Radio Service |
| BTS | Base Transceiver Station |
| CDMA | Code Division Multiple Access |
| EBS | Educational Broadband Services |
| eNodeB | Evolved Node B |
| EVDO | Evolution-Data Optimized |
| gNodeB | Next Generation Node B |
| GPS | Global Positioning System |
| GSM | Global System for Mobile Communications |
| HRPD | High Rate Packet Data |
| eHRPD | Enhanced High Rate Packet Data |
| LTE | Long Term Evolution |
| LTE-A | Long Term Evolution Advanced |
| PCS | Broadband Personal Communications Service |
| RNC | Radio Network Controller |
| SyncE | Synchronous Ethernet |
| TDM | Time-Division Multiplexing |
| VOIP | Voice Over Internet Protocol |
| WAN | Wide Area Network |
| WCS | Wireless Communications Service |
| WiMAX | Worldwide Interoperability for Microwave Access |

Further, various technical terms are used throughout this description. A definition of such terms can be found in, for example, Newton's Telecom Dictionary by H. Newton, 31st Edition (2018). These definitions are intended to provide a clearer understanding of the ideas disclosed herein but are not intended to limit the scope of the present invention. The definitions and terms should be interpreted broadly and liberally to the extent allowed by the meaning of the words offered in the above-cited reference.

As used herein, the term "node" is used to refer to network access technology, such as eNode, gNode, etc. In other aspects, the term "node" may be used to refer to one or more antennas being used to communicate with a user device.

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of base stations (i.e., cell sites, cell towers) to provide network coverage. The base stations are employed to broadcast and transmit transmissions to user devices of the telecommunications network. An access point may be considered to be a portion of a base station that may comprise an antenna, a radio, and/or a controller. In aspects, an access point is defined by its ability to communicate with a user equipment (UE), such as a wireless communication device (WCD), according to a single protocol (e.g., 3G, 4G, LTE, 5G, and the like); however, in other aspects, a single access point may communicate with a UE according to multiple protocols. As used herein, a base station may comprise one access point or more than one access point. Factors that can affect the telecommunications transmission include, e.g., location and size of the base stations, and frequency of the transmission, antenna array configuration corresponding to both the access point and the UE, among other factors. The base stations are employed to broadcast and transmit transmissions to user devices of the telecommunications network.

As employed herein, a UE (also referenced herein as a user device) or WCD can include any device employed by an end-user to communicate with a wireless telecommunications network. A UE can include a mobile device, a mobile broadband adapter, or any other communications device employed to communicate with the wireless telecommunications network. A UE, as one of ordinary skill in the art may appreciate, generally includes one or more antenna coupled to a radio for exchanging (e.g., transmitting and receiving) transmissions with a nearby base station.

During emergency calls, connectivity is more important than identifying a location of the UE. Even if the UE reports an incomplete or an incorrect location, the call follows the default routing path and is connected to an emergency call relay center (ECRC). The ECRC is further able to route the call to the correct Public-Safety Answering Point (PSAP).

However, during emergency texts, identifying a location of the UE is critical. If the UE does not provide a location or provides an incomplete location, the network cannot connect the UE to a PSAP operator. Moreover, if the UE provides an incorrect location, or if the UE is routed to a PSAP that does not support emergency texts, the user will receive a bounce-back text indicating the user needs to make an emergency call instead. However, if the user is making an emergency text rather than an emergency call, it can be inferred that an emergency text is critical in that scenario (e.g., the user does not want to alert others that emergency services have been contacted). Currently, the network waits to request a location calculation until after the user composes a text message and hits send. This delay can prevent the UE from reporting a complete or correct location.

At a high level, systems, methods, and computer-readable media of the present invention enable the network to provide additional time to location services so a complete location can be determined, prior to an SMS message being composed and sent. To do so, the UE transitions into an emergency mode as soon as the recipient of the text message is identified as an emergency number (e.g., 911). This immediately causes the UE to unblock all numbers (i.e., in case emergency services needs to initiate a voice call to the UE), enable location services, and initiate a location calculation. As a result, the location calculation is already determined by the time the user composes the text hits send. In some aspects, the network initiates a control plane (CP) or user plane (UP) location update per the latest version of 3GPP TS 23.167 when the PSAP requests it via the call services provider.

In a first aspect of the present invention, computer-readable media is provided, the computer-readable media having computer-executable instructions embodied thereon that, when executed, perform a method for calculating a location of UE prior to communicating an SMS message to an emergency number. The method includes receiving, at the UE, a selection of the emergency number as a recipient of the SMS message. The method also includes causing the UE to enter into a pre-emergency mode. The method further includes, while the UE is receiving input in a body of the SMS message, calculating a location of the UE. The method also includes, upon receiving, at the UE, an indication to send the SMS message, causing the SMS message and the location of the UE to be communicated.

In a second aspect of the present invention, a method for calculating a location of UE prior to communicating an SMS message to an emergency number. The method includes receiving, at the UE, a selection of the emergency number as a recipient of the SMS message. The method also includes causing the UE to enter into a pre-emergency mode. The method further includes, while the UE is receiving input in a body of the SMS message, calculating a location of the UE. The method also includes, upon receiving, at the UE, an indication to send the SMS message, causing the SMS message and the location of the UE to be communicated.

In a third aspect of the present invention, a system for calculating a location of user equipment (UE) prior to communicating an SMS message to an emergency number is provided. The system comprises a node configured to wirelessly communicate with one or more UEs. The system also comprises a UE of the one or more UEs that: upon receiving a selection of an emergency number as a recipient of an SMS message, enters into a pre-emergency mode; while receiving input in a body of the SMS message, calculates a location of the UE; and upon receiving an indication to send the SMS message, communicates the SMS message and the location of the UE to a public safety answering point corresponding to the emergency number via the node.

Turning to FIG. 1, a network environment suitable for use in implementing embodiments of the present disclosure is provided. Such a network environment is illustrated and designated generally as network environment 100. Network environment 100 is but one example of a suitable network environment and is not intended to suggest any limitation as to the scope of use or functionality of the disclosure. Neither should the network environment 100 be interpreted as having any dependency or requirement relating to any one or combination of components illustrated.

Figure 5:
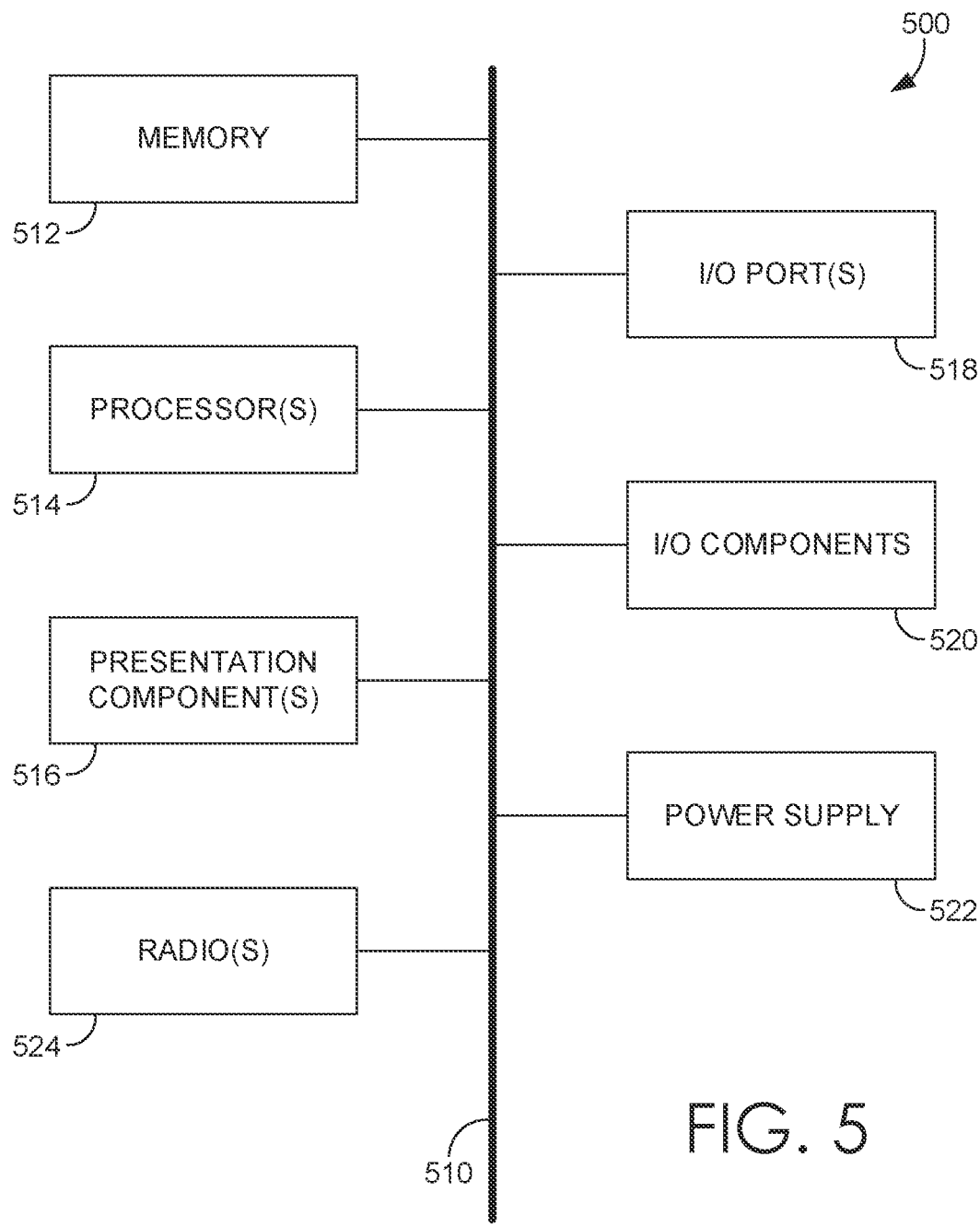
FIG. 5 depicts an exemplary computing device suitable for use in implementations of aspects herein.

A network cell may comprise a base station to facilitate wireless communication between a communications device within the network cell, such as communications device 500 described with respect to FIG. 5, and a network. As shown in FIG. 1, a communications device may be a UE 106. In the network environment 100, UE 106 may communicate with other devices, such as mobile devices, servers, etc. The UE 106 may take on a variety of forms, such as a personal computer, a laptop computer, a tablet, a netbook, a mobile phone, a smart phone, a personal digital assistant, or any other device capable of communicating with other devices. For example, the UE 106 may take on any form such as, for example, a mobile device or any other computing device capable of wirelessly communication with the other devices using a network. Makers of illustrative devices include, for example, Research in Motion, Creative Technologies Corp., Samsung, Apple Computer, and the like. A device can include, for example, a display(s), a power source(s) (e.g., a battery), a data store(s), a speaker(s), memory, a buffer(s), and the like. In embodiments, UE 106 comprises a wireless or mobile device with which a wireless telecommunication network(s) can be utilized for communication (e.g., voice and/or data communication). In this regard, the UE 106 can be any mobile computing device that communicates by way of, for example, a 5G network.

The UE 106 may utilize network 104 to communicate with other computing devices (e.g., mobile device(s), a server(s), a personal computer(s), etc.). In embodiments, network 104 is a telecommunications network, or a portion thereof. A telecommunications network might include an array of devices or components, some of which are not shown so as to not obscure more relevant aspects of the invention. Components such as terminals, links, and nodes (as well as other components) may provide connectivity in some embodiments. Network 104 may include multiple networks, as well as being a network of networks, but is shown in more simple form so as to not obscure other aspects of the present disclosure. Network 104 may be part of a telecommunications network that connects subscribers to their immediate service provider. In embodiments, network 104 is associated with a telecommunications provider that provides services to user devices, such as UE 106. For example, network 104 may provide voice services to user devices or corresponding users that are registered or subscribed to utilize the services provided by a telecommunications provider. It is contemplated network 104 can be any communication network providing voice and/or data service(s), such as, for example, a 1× circuit voice, a 3G network (e.g., CDMA, CDMA1000, WCDMA, GSM, UMTS), a 4G network (WiMAX, LTE, HSDPA), a 5G network, or the like.

The network environment 100 may include a database (not shown). The database may be similar to the memory component 512 in FIG. 5 and can be any type of medium that is capable of storing information. The database can be any collection of records (e.g., network or device information or a civic address database comprising a mapping of geodetic locations to geocoded locations). In one embodiment, the database includes a set of embodied computer-executable instructions that, when executed, facilitate various aspects disclosed herein. These embodied instructions will variously be referred to as "instructions" or an "application" for short.

As previously mentioned, the UE 106 may communicate with other devices by using a base station, such as base station 102. In embodiments, base station 102 is a wireless communications station that is installed at a fixed location, such as at a radio tower, as illustrated in FIG. 1. The radio tower may be a tall structure designed to support one or more antennas for telecommunications and/or broadcasting. In other embodiments, base station 102 is a mobile base station. The base station 102 may be an MMU and include gNodeB for mMIMO/5G communications via network 104. In this way, the base station 102 can facilitate wireless communication between UE 106 and network 104.

As stated, the base station 102 may include a radio (not shown) or a remote radio head (RRH) that generally communicates with one or more antennas associated with the base station 102. In this regard, the radio is used to transmit signals or data to an antenna associated with the base station 102 and receive signals or data from the antenna. Communications between the radio and the antenna can occur using any number of physical paths. A physical path, as used herein, refers to a path used for transmitting signals or data. As such, a physical path may be referred to as a radio frequency (RF) path, a coaxial cable path, cable path, or the like.

The antenna is used for telecommunications. Generally, the antenna may be an electrical device that converts electric power into radio waves and converts radio waves into electric power. The antenna is typically positioned at or near the top of the radio tower as illustrated in FIG. 1. Such an installation location, however, is not intended to limit the scope of embodiments of the present invention. The radio associated with the base station 102 may include at least one transceiver configured to receive and transmit signals or data.

In practice, a user of a UE 106 may need emergency services. The user communicates an SMS message to emergency services (e.g., 911) and the base station 102 facilitates communication between UE 106 and PSAP 108 via the network. In order to dispatch an emergency vehicle 110 to the proper location, PSAP 108 needs the location of the UE so the emergency vehicle 110 can provide assistance to the user at that location.

Continuing, the network environment 100 may further include a location before text engine 112. The location before text engine 112 may be configured to, among other things, calculate a location of the UE prior to communicating an SMS message to an emergency number, in accordance with the present disclosure. Though location before text engine 112 is illustrated as a component of UE 106 in FIG. 1, it may be a standalone device (e.g., a server having one or more processors), a service provided via the 5G network 104, a component of base station 102, a component of the PSAP 108, or may be remotely located.

Figure 2:
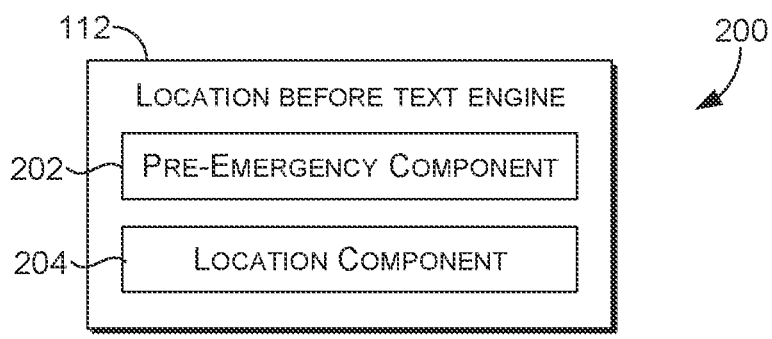
FIG. 2 depicts a diagram of a location before text engine, in accordance with aspects herein.

Referring now to FIG. 2, the location before text engine 112 may include, among other things, pre-emergency component 202 and location component 204. The location before text engine 112 may receive, among other things, data from a user device, such as UE 102. Additionally or alternatively, location before text engine 112 may receive, among other things, requests from PSAP 108, data from a node, such as base station 104, or from elements of the core network.

Pre-emergency component 202 generally receives a selection of an emergency number as a recipient of a SMS message. Pre-emergency component 202 causes the UE to enter a pre-emergency mode. As a result, pre-emergency component 202 causes the UE to unblock all numbers which enables emergency support personnel to initiate a voice call with the UE, if needed. Additionally or alternatively, pre-emergency component 202 enables location services at the UE.

Location component 204 generally calculates a location of the UE. For example, after the UE has entered pre-emergency mode, location component 204 calculates a location of the UE while the UE is receiving input in a body of the SMS message. That is, rather than waiting until the SMS message has been composed and the user has selected to send the SMS message, location component 204 begins calculating the location of the UE early. Consequently, upon receiving an indication to send the SMS message, location component has already calculated the location of the UE and the SMS message and the location of the UE are communicated without delay.

Figure 3:
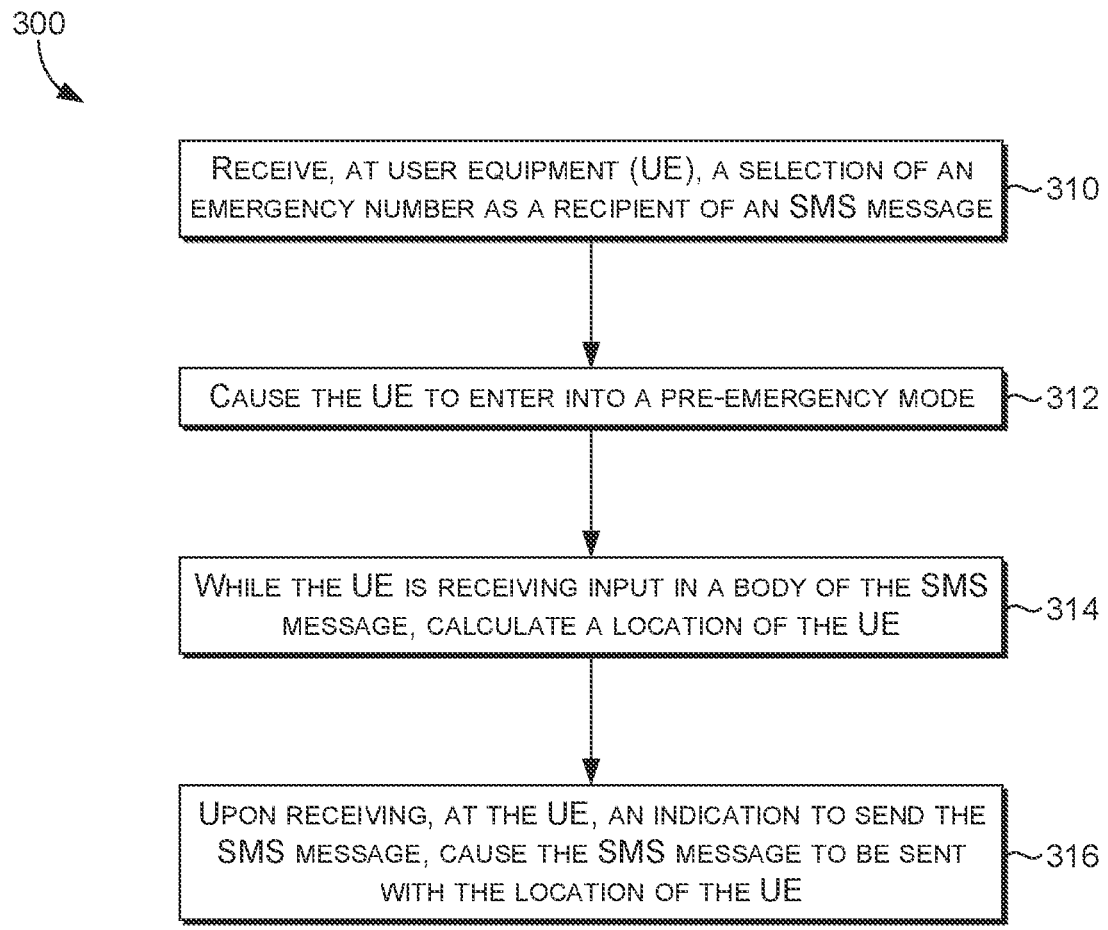
FIG. 3 depicts an exemplary method, in accordance with aspects herein.

Turning now to FIG. 3, flow diagram 300 comprises an exemplary method for calculating a location of UE prior to communicating an SMS message to an emergency number. Initially, at block 310, a selection of the emergency number as a recipient of the SMS message is received at the UE. At block 312, the UE enters into a pre-emergency mode. In some aspects, the pre-emergency mode unblocks all numbers at the UE which may enable emergency support personnel to initiate a voice call with the UE. Additionally or alternatively, the pre-emergency mode enables location services at the UE.

At block 314, while the UE is receiving input in a body of the SMS message, a location of the UE is calculated. In aspects, a location update may be initiated by the network and received by the UE. In some aspects, the location update may be requested by a PSAP via a control plane. In other aspects, the location update may be requested by the PSAP via a user plane. In either scenario, the location services is able to provide an updated location of the UE before the SMS is composed and sent. Accordingly, at block 316, upon receiving, at the UE, an indication to send the SMS message, the SMS message and the location of the UE are communicated.

Figure 4:
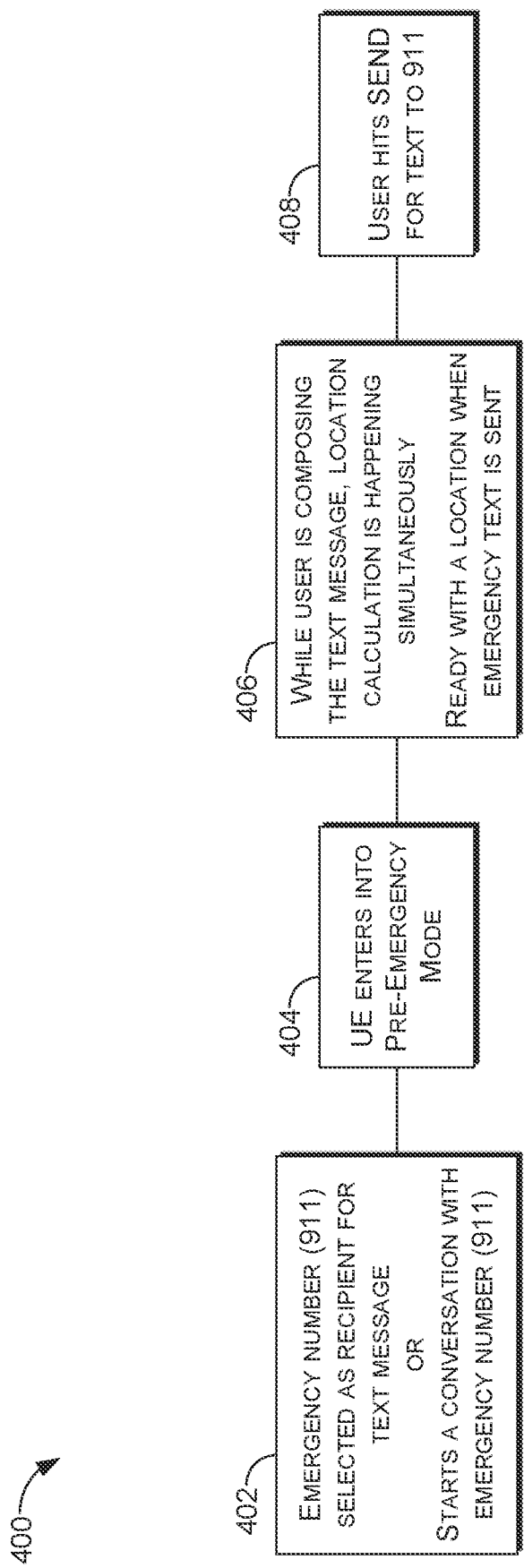
FIG. 4 depicts an exemplary communication flow, in accordance with aspects herein.

FIG. 4 depicts an exemplary communication flow 400, in accordance with aspects of the present invention. Initially, at block 402, an emergency number (e.g., 911) is selected as a recipient for a text message or a conversation is started with an emergency number. At block 404, the UE enters into a pre-emergency mode.

While the user is composing the text message, at block 406, the location calculation is happening simultaneously. As can be appreciated, the UE is ready with a location when the emergency text is sent. At block 408, the user hits send, and the emergency text and location is sent to the emergency number.

Referring now to FIG. 5, a diagram is depicted of an exemplary computing environment suitable for use in implementations of the present disclosure. In particular, the exemplary computer environment is shown and designated generally as computing device 500. Computing device 500 is but one example of a suitable computing environment and is not intended to suggest any limitation as to the scope of use or functionality of the invention. Neither should computing device 500 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 5, computing device 500 includes bus 502 that directly or indirectly couples the following devices: memory 504, one or more processors 506, one or more presentation components 508, input/output (I/O) ports 510, I/O components 512, power supply 514 and radio(s) 516. Bus 502 represents what may be one or more busses (such as an address bus, data bus, or combination thereof). Although the devices of FIG. 5 are shown with lines for the sake of clarity, in reality, delineating various components is not so clear, and metaphorically, the lines would more accurately be grey and fuzzy. For example, one may consider a presentation component, such as a display device to be one of I/O components 512. Also, processors, such as one or more processors 506, have memory. The present disclosure hereof recognizes that such is the nature of the art, and reiterates that FIG. 5 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 5 and refer to "computer" or "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information, such as computer-readable instructions, data structures, program modules, or other data.

Computer storage media includes RAM, ROM, EEPROM, flash memory or other memory technology, CD-ROM, DVD or other optical disk storage, magnetic cassettes, magnetic tape, magnetic disk storage, or other magnetic storage devices. Computer storage media does not comprise a propagated data signal.

Communication media typically embodies computer-readable instructions, data structures, program modules, or other data in a modulated data signal, such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media such as acoustic, RF, infrared, and other wireless media. Combinations of any of the above should also be included within the scope of computer-readable media.

Memory 504 includes computer-storage media in the form of volatile and/or nonvolatile memory. Memory 504 may be removable, non-removable, or a combination thereof. Exemplary memory includes solid-state memory, hard drives, optical-disc drives, etc. Computing device 500 includes one or more processors 506 that read data from various entities, such as bus 502, memory 504, or I/O components 512. One or more presentation components 508 presents data indications to a person or other device. Exemplary one or more presentation components 508 include a display device, speaker, printing component, vibrating component, etc. I/O ports 510 allow computing device 500 to be logically coupled to other devices, including I/O components 512, some of which may be built in computing device 500. Illustrative I/O components 512 include a microphone, joystick, game pad, satellite dish, scanner, printer, wireless device, etc.

Radio 516 represents a radio that facilitates communication with a wireless telecommunications network. Illustrative wireless telecommunications technologies include CDMA, GPRS, TDMA, GSM, and the like. Radio 516 might additionally or alternatively facilitate other types of wireless communications including Wi-Fi, WiMAX, LTE, or other VoIP communications. As can be appreciated, in various embodiments, radio 516 can be configured to support multiple technologies and/or multiple radios can be utilized to support multiple technologies. A wireless telecommunications network might include an array of devices, which are not shown so as to not obscure more relevant aspects of the invention. Components, such as a base station, a communications tower, or even access points (as well as other components), can provide wireless connectivity in some embodiments.

Many different arrangements of the various components depicted, as well as components not shown, are possible without departing from the scope of the claims below. Embodiments of this technology have been described with the intent to be illustrative rather than be restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

The invention claimed is:

1. One or more non-transitory computer-readable media having computer-executable instructions embodied thereon that, when executed, perform a method for calculating a location of user equipment (UE) prior to communicating a short message service (SMS) message to an emergency number, the method comprising:
   receiving, at the UE, a selection of the emergency number as a recipient of the SMS message;
   causing the UE to enter into a pre-emergency mode and to unblock all numbers at the UE;
   while the UE is receiving input in a body of the SMS message, calculating a location of the UE;
   upon receiving, at the UE, an indication to send the SMS message, causing the SMS message and the location of the UE to be communicated.

2. The media of claim 1, wherein the unblocking enables emergency support personnel to initiate a voice call with the UE.

3. The media of claim 1, further comprising, upon causing the UE to enter into the pre-emergency mode, enabling, at the UE, location services.

4. The media of claim 3, further comprising receiving, at the UE, a location update request initiated by the network.

5. The media of claim 4, wherein the location update request is requested by a public safety answering point via a control plane.

6. The media of claim 4, wherein the location update request is requested by a public safety answering point via a user plane.

7. The media of claim 1, further comprising, upon failure to deliver the SMS message, initiating a voice call to the emergency number.

8. A method for calculating a location of user equipment (UE) prior to communicating a short message service (SMS) message to an emergency number, the method comprising:
   receiving, at the UE, a selection of the emergency number as a recipient of the SMS message;
   causing the UE to enter into a pre-emergency mode and to unblock all numbers at the UE;
   while the UE is receiving input in a body of the SMS message, calculating a location of the UE;
   upon receiving, at the UE, an indication to send the SMS message, causing the SMS message and the location of the UE to be communicated.

9. The method of claim 8, wherein the unblocking enables emergency support personnel to initiate a voice call with the UE.

10. The method of claim 8, further comprising, upon causing the UE to enter into the pre-emergency mode, enabling, at the UE, location services.

11. The method of claim 10, further comprising receiving, at the UE, a location update request initiated by the network.

12. The method of claim 11, wherein the location update request is requested by a public safety answering point via a control plane.

13. The method of claim 11, wherein the location update request is requested by a public safety answering point via a user plane.

14. The method of claim 8, further comprising, upon failure to deliver the SMS message, initiating a voice call to the emergency number.

15. A system for calculating a location of user equipment (UE) prior to communicating a short message service (SMS) message to an emergency number, the system comprising:
   a node configured to wirelessly communicate with one or more UEs; and
   a UE of the one or more UEs that:
   (1) upon receiving a selection of an emergency number as a recipient of an SMS message, enters into a pre-emergency mode and unblocks all numbers at the UE;
   (2) while receiving input in a body of the SMS message, calculates a location of the UE; and
   (3) upon receiving an indication to send the SMS message, communicates the SMS message and the location of the UE to a public safety answering point corresponding to the emergency number via the node.

16. The system of claim 15, wherein the unblocking enables emergency support personnel to initiate a voice call with the UE.

17. The system of claim 15, further comprising, upon entering into the pre-emergency mode, enabling, at the UE, location services.

18. The method of claim 17, further comprising receiving, at the UE, a location update request initiated by the network.

19. The method of claim 18, wherein the location update request is requested by a public safety answering point via a control plane or a user plane.

20. The system of claim 15, further comprising, upon failure to deliver the SMS message, initiating a voice call to the emergency number.

* * * * *